US010022796B2

(12) United States Patent
Wang

(10) Patent No.: US 10,022,796 B2
(45) Date of Patent: Jul. 17, 2018

(54) METHOD OF MAKING ND—FE—B MAGNETIC MATERIALS WITH REDUCED HEAVY RARE EARTH METALS

(71) Applicant: GM Global Technology Operations LLC, Detroit, MI (US)

(72) Inventor: Yucong Wang, West Bloomfield, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 924 days.

(21) Appl. No.: 14/471,815

(22) Filed: Aug. 28, 2014

(65) Prior Publication Data

US 2016/0064144 A1 Mar. 3, 2016

(51) Int. Cl.
| H01F 41/02 | (2006.01) |
| B22F 3/15 | (2006.01) |
| H01F 1/057 | (2006.01) |
| B22F 1/02 | (2006.01) |
| B22F 3/105 | (2006.01) |
| B22F 3/24 | (2006.01) |

(52) U.S. Cl.
CPC ............ B22F 3/15 (2013.01); B22F 1/025 (2013.01); B22F 3/1055 (2013.01); H01F 1/0577 (2013.01); H01F 41/0273 (2013.01); B22F 2003/247 (2013.01); B22F 2003/248 (2013.01); B22F 2998/10 (2013.01); B22F 2999/00 (2013.01); C22C 2202/02 (2013.01); Y02P 10/295 (2015.11)

(58) Field of Classification Search
CPC ...................................................... B22F 3/15
See application file for complete search history.

(56) References Cited

U.S. PATENT DOCUMENTS 7,632,360 B2 * 12/2009 Mori .................. C22C 1/0441
148/101
9,468,972 B2 10/2016 Wang

FOREIGN PATENT DOCUMENTS

CN 103151159 A 6/2013

OTHER PUBLICATIONS

B Lynn Ferguson and Randall German, "Powder Shaping and Consolidation Technologies," ASM Handbook, vol. 7 (1998), pp. 313-320.*
Chonglin, W., "HIP Ferrites for Magnetic Heads," Institute of Metal Research, Academia Sinica, 1998, 5 pgs.
Herget, C.S., "Metallurgical Methods for the Production of Rate Earth-Transition Metal Permanent Magnet Materials," Poed. Rep. (Jun. 1987), v. 42, pp. 483-444.
(Continued)

Primary Examiner — Christopher Kessler
(74) Attorney, Agent, or Firm — Reising Ethington P.C.

(57) ABSTRACT

A method of making a magnetic material includes a step of providing a first material in the form of a core powder containing Nd, Fe and B. The first material is combined with the second material to form a powder combination. The second material includes a component selected from the group consisting of Dy, Tb, and combinations thereof. The powder combination is encapsulated to form an encapsulated powder combination. A magnetic field is applied to the powder combination during encapsulation and thereafter to align the magnetic dipoles therein. The encapsulated powder combination is isostatically pressed with heat to form the magnetic material.

21 Claims, 3 Drawing Sheets

(56) References Cited

OTHER PUBLICATIONS

Plusa, D. et al., "Domain Structure and Domain-Wall Energy in Polycrystalline R2Fe14B Compounds (R ≡Pr, Nd, Gd, Dy)," J. of the Less-Common Metals, v. 133 (1987), pp. 23-243.
Rodewald, W., "Magnetization and Aging of Sintered Nd—Fe—B Magnets," J. of the Less-Common Metals, v. 111 (1985), pp. 77-81.

\* cited by examiner

METHOD OF MAKING ND—FE—B MAGNETIC MATERIALS WITH REDUCED HEAVY RARE EARTH METALS

TECHNICAL FIELD

In at least one aspect, the present invention relates generally to electric motors and their manufacture, and more particularly, to methods for forming permanent magnets that use rare earth (RE) elements for improved power density of electric motors (in comparison with induction motors etc.), especially the heavy rare earth elements such as Dy and Tb for improved high temperature magnetic properties.

BACKGROUND

Permanent magnets are used in various areas such as microelectronics, automobiles, medical devices, power generation, and the like. Permanent magnets are typically formed from hard magnetic materials which also find applications in the automotive, aerospace and telecommunication industries. Rare earth magnets, such as Nd—Fe—B, have a higher energy density than most other hard magnets. Moreover, such magnets are used in automotive applications such as starters, small motors, alternators, sensors, meters, and electric and hybrid vehicle propulsion systems.

Sintered rare earth magnets are usually made from powder metals by forming to shape under pressure and then sintering. The overwhelming majority of hard magnets are formed from ferrite and Nd—Fe—B. Ferrite is less expensive but with only modest magnetic properties. This material is mainly used in applications where size and weight are not main design considerations.

The intrinsic properties necessary for high strength permanent magnets include a high saturation magnetization, large magnetocrystalline anisotropy, and a reasonable high Curie temperature. These properties are strongly influenced by the factors such as microstructure, chemical composition, magnet size, surface coating etc. The material properties (e.g. the magnetic properties) that are influenced by the microstructure include phases and composition distribution, grain size, grain morphology, and orientation, as well as grain boundaries. When the grain size is below a critical limit known as the single domain limit, demagnetization is much more difficult, leading to excellent hard magnetic properties. The single domain limit is related to specific intrinsic magnetic properties, including the anisotropy constant and the saturation magnetization. For Nd—Fe—B magnets, the single domain limit is about 300 nm.

The preferred commercial technique to generate a fine-scale microstructure is melt spinning. Depending on the processing parameters, melt spinning generates a microstructure that includes fine, equiaxed grains on the order of 20-30 nm or an amorphous structure. It is critical to retain a fine microstructure upon further processing to optimize the magnetic properties. Anisotropic magnets are produced with grains in preferred crystallographic alignment. A high degree of crystallographic alignment results in high energy products. The degradation in the microstructure, and the limited crystallographic alignment achievable, limits commercially available energy products to about 50 megagauss-oersteds (MGOe), comparing to the theoretical maximum of 64 MGOe.

Sintered Nd—Fe—B permanent magnets have very good magnetic properties at low temperatures. After magnetization, permanent magnets are in a thermodynamically non-equilibrium state. Any changes in the external conditions, in particular the temperature, result in a transition to another more stable state. These transitions are typically accompanied by changes in the magnetic properties. Due to limited low Curie temperature of the $Nd_2Fe_{14}B$ phase, the magnetic remanence and intrinsic coercivity decrease rapidly with increased temperature. There are two common approaches for improving the thermal stability of Nd—Fe—B permanent magnets and for increasing magnetic properties in order to obtain compact, lightweight, and powerful motors for hybrid and electrical vehicles. One approach is to raise the Curie temperature by adding Co, which is completely soluble in the $Nd_2Fe_{14}B$ phase. However, the coercivity of the Nd—Fe—B magnets with Co decreases, possibly because of the nucleation sites for reverse domains. The second approach is to add heavy rare-earth elements. It is known that the substitution of dysprosium (Dy) for neodymium (Nb) or iron (Fe) in Nd—Fe—B magnets results in increases of the anisotropic field and the intrinsic coercivity, and a decrease of the saturation magnetization (C. S. Herget, Metal, Poed. Rep. V. 42, P. 438 (1987). W. Rodewald, J. Less-Common Met., V111, P 77 (1985). D. Plusa, J. J. Wystocki, Less-Common Met. V. 133, P. 231 (1987)). It is believed that once a nucleus of reversed domain appears at the surface of the grain, magnetic reversal of the whole grain occurs immediately. Reverse magnetic domain only comes from the grain boundary. If we can make Dy uniformly distributed around the grain boundary, the coercivity should be increased, and the remanence should not change much. Therefore, it is a common practice to add the heavy rare-earth metals such as Dy or Tb into the mixed metals before melting and alloying. However, Dy and Tb are very rare and expensive. In the nature, very small fraction of rare-earth metals are heavy HEs, and heavy REs contain only about 2-7% Dy. The price of Dy has increased sharply in recent times. Tb is needed if even higher magnetic properties are required, and it is much more expensive than Dy.

The ideal microstructure for sintered Nd—Fe—B based magnets is $Fe_{14}Nd_2B$ grains perfectly isolated by the non-ferromagnetic Nd-rich phase (a eutectic matrix of mainly Nd plus some $Fe_4Nd_{1.1}B_4$ and Fe—Nd phases stabilized by impurities). The addition of Dy and/or Tb leads to the formation of different ternary intergranular phases based on Fe, Nd and Dy or Tb. These phases are located in the grain boundary region and at the surface of the $Fe_{14}Nd_2B$ grains.

Any addition of elements to improve the magnetic property should fulfill the following conditions: 1) the intermetallic phase should be nonferromagnetic to separate the ferromagnetic grains; 2) the intermetallic phase must have a lower melting point than the $Nd_2Fe_{14}B$ phase to produce a dense material via liquid phase sintering; and 3) the elements should have a low solubility in $Nd_2Fe_{14}B$ to keep good magnetic properties. The coercivity is known to be greatly influenced by the morphology of the boundary phases between $Nd_2Fe_{14}B$ grains.

Accordingly, there is a need for improved methods of making permanent magnets, and in particular, Nd—Fe—B based magnets

SUMMARY

The present invention solves one or more problems of the prior art by providing, in at least one embodiment, a method of making a magnetic material. The method includes a step of providing a first material in the form of a core powder containing Nd, Fe and B. The first material is combined with the second material to form a powder combination. The second material includes a component selected from the group consisting of Dy, Tb, and combinations thereof. The powder combination is encapsulated to form an encapsulated powder combination. A magnetic field is applied during encapsulating and thereafter to the powder combination to align the magnetic dipoles therein. The encapsulated powder combination is isostatically pressed while heating such that the temperature of the powder combination increases from a first temperature to a second temperature to form a pressed composition.

In another embodiment, a method of making a magnetic material is provided. The method includes a step of providing a core powder containing Nd, Fe and B. The core powder is combined with a rare earth metal-containing powder to form a powder combination. The powder combination is encapsulated to form an encapsulated powder combination. A magnetic field is applied during encapsulating and thereafter to the powder combination to impart magnetization thereto. The encapsulated powder combination is isostatically pressed with an inert gas at pressures from 50 MPa to 350 MPa. During this step, the encapsulated powder is heated such that the temperature of the powder combination increases from a first temperature of about 5° C. to 35° C. to a second temperature of about 500° C. to 1000° C. to form a pressed composition. In some cases, there are additional holding temperatures between the first and the second temperatures, with each having a holding time of 2 minutes to 2 hours. The pressed composition is finally heated and sintered at a temperature from about 500 to 1000° C. There may be additional stepped holding temperatures Advantageously, the methods set forth above allow a lower processing temperature and a shorter total processing time for making magnetic materials with high pressure in comparison to traditional sintering processes. The lower temperature and shorter processing time enables increased Dy distribution along the grain boundaries with an increased non-uniformity of Dy distribution in the microstructure. This distribution increases magnetic properties such as coercivity at high temperature, which is crucial for traction motor applications in hybrid electric vehicles.

DETAILED DESCRIPTION

Figure 1A:
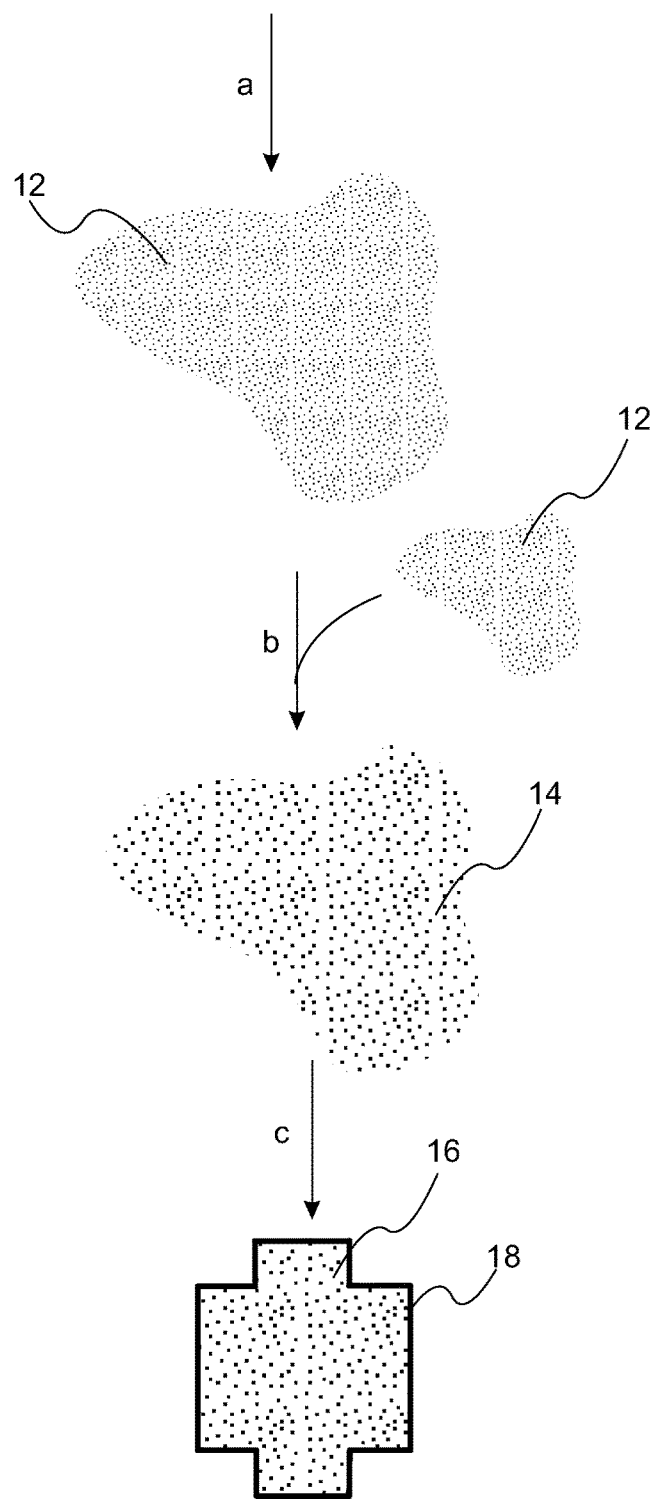
FIGS. 1A-C provide a schematic flow chart of a method of making a magnetic material using hot isostatic pressing.

Reference will now be made in detail to compositions, embodiments and methods of the present invention which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention. It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

Except in the examples, or where otherwise expressly indicated, all numerical quantities in this description indicating amounts of material or conditions of reaction and/or use are to be understood as modified by the word "about" in describing the broadest scope of the invention which is intended to mean up to ±10% of an indicated value. Also, unless expressly stated to the contrary: percent, "parts of," and ratio values are by weight; the description of a group or class of materials as suitable for a given purpose in connection with the invention implies that mixtures of any two or more of the members of the group or class are equally suitable; description of constituents in chemical terms refers to the constituents at the time of addition to any combination specified in the description, and does not necessarily preclude chemical interactions among the constituents of a mixture once mixed; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

It must also be noted that, as used in the specification and the appended claims, the singular form "a," "an," and "the" comprise plural referents unless the context clearly indicates otherwise. For example, reference to a component in the singular is intended to comprise a plurality of components.

Throughout this application, where publications are referenced, the disclosures of these publications in their entireties are hereby incorporated by reference into this application to more fully describe the state of the art to which this invention pertains.

The term "room temperature" refers to a range of about 5° C. to about 35° C.

The term "rare earth metal" refers to the lanthanide metals, scandium, and yttrium. Useful rare earth metals in the context of the present invention are dysprosium (Dy) and terbium (Tb).

The present method uses hot isostatic pressing (HIP) to form a magnetic material. Hot isostatic pressing is a well-established process for the improvement of a wide variety of materials such as titanium, steel, aluminum and superalloys. HIP is the simultaneous application of high temperature and pressure to metals and other materials for a specified amount of time in order to get a solid part for improving their mechanical properties. In the HIP unit, a high temperature furnace is enclosed in a pressure vessel. The temperature, pressure and process times are all precisely controlled. The parts are heated in an inert gas, generally argon, which applies "isostatic" pressure uniformly in all directions. This causes the material to become "plastic" allowing voids to collapse under the differential pressure. The surfaces of the voids diffusion bond together to eliminate the defects achieving high density, even near theoretical density.

Hot isostatic pressing reduces or eliminates voids within a casting. Encapsulated powders can be consolidated to create fully dense materials. Moreover, dissimilar materials can be bonded together to manufacture unique, cost effective components. Advantageously, the hot isostatic pressing parameters can be established to minimize subsequent heat treatment requirements. Characteristically, in isostatic pressing, the pressure is uniform in all directions or isostatic. The material is consolidated, in simpler terms, to a "plastic state" which collapses the voids. The clean surfaces of the voids bond together making the components or parts stronger. Voids that were collapsed do not change or alter the shape of the parts or components. An important feature of hot isostatic pressing is that the interface of a metal powder must be isolated from the gaseous pressure medium. This is often achieved by encapsulating the metal powder. The current invention provides two methods for encapsulating: 1) canning with capsules, and 2) selective laser sintering.

Figure 1B:
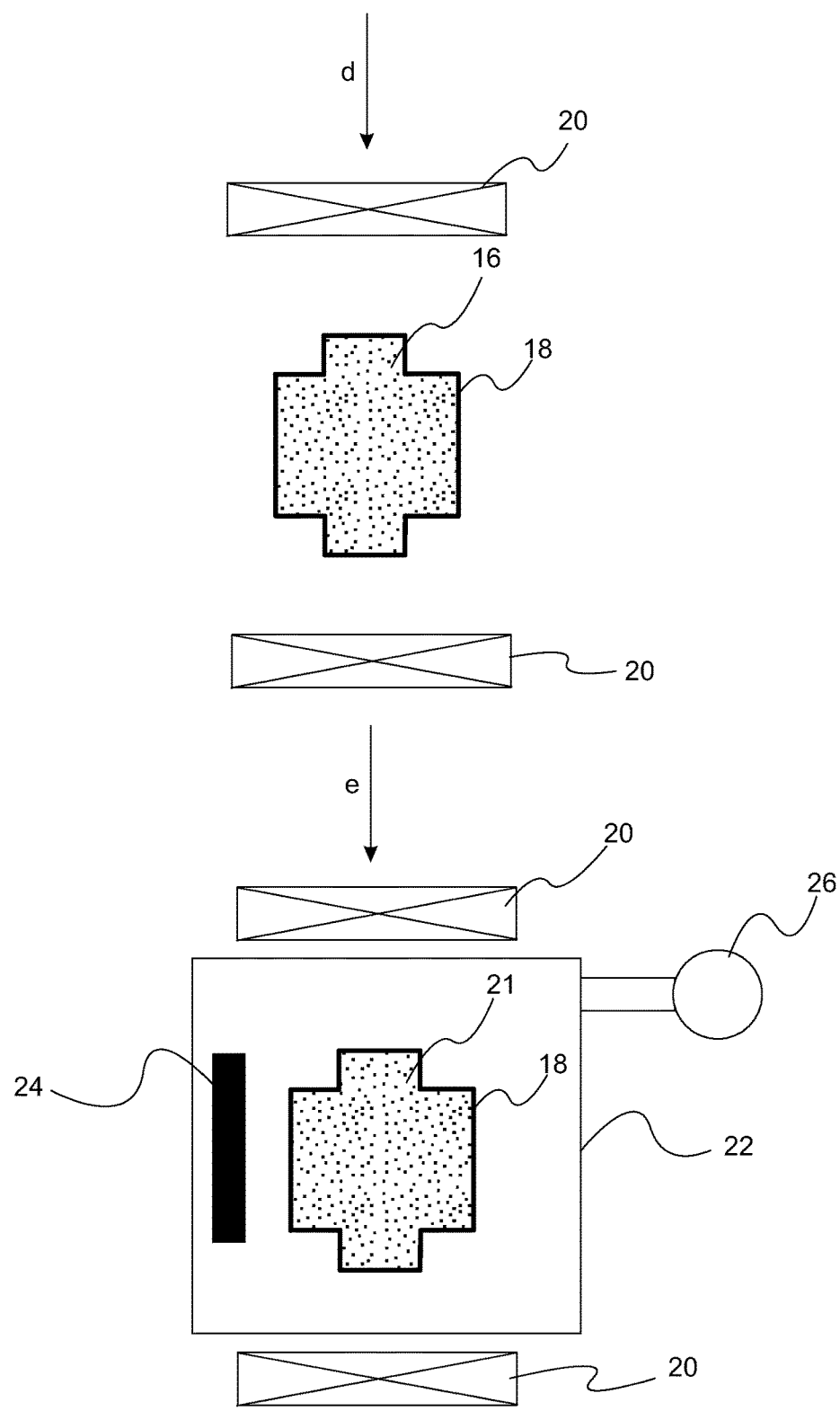
Figure 1C:
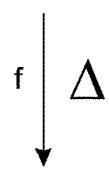
Figure 1C:
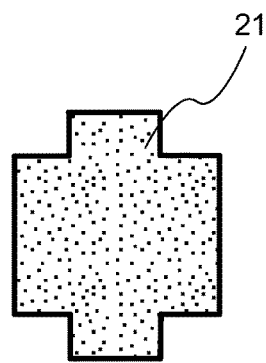
Figure 1C:
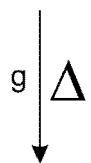
Figure 1C:
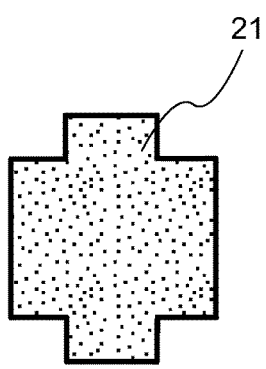

With reference to FIG. 1, a schematic flow chart depicting a method for making a magnetic material is provided. In step a), a first material 10 in the form of a core powder containing Nd, Fe and B is provided. In one variation, the first material is described by the formula $Nd_{2+/-10\%}Fe_{14+/-10\%}B_{1+/-10\%}$ and in particular, $Nd_2Fe_{14}B$. In a refinement, the first material further includes an element selected from the group consisting of Pr, Ga, Co, Cu, and combinations thereof. These additional elements can be substitutional for Nd and/or Fe and/or B or interstitial. In step b), the first material is combined with a second material 12 to form a powder combination 14. In some variation, second material 12 is in the form of a powder. Such powders may include particles (i.e., non-flakes) and/or flakes having an aspect ratio of width to thickness of about 5 to about 40. Characteristically, the second material 14 includes a component selected from the group consisting of Dy, Tb, and combinations thereof. In a refinement, the second material comprises from about 5 to about 95 weight percent dysprosium and 95 to 5 weight percent terbium. In another refinement, the second material further includes an element selected from the group consisting of Fe, B, Pr, Ga, B, Co, Cu, and combinations thereof.

Any number of processes for combining the first material and the second material known to those skilled in the art may be utilized. For example, first material 10 can be coated with a layer of second material 12 by processes such as physical vapor deposition (e.g., sputtering, evaporation, etc.) or chemical vapor deposition. In one refinement, mechanical alloying is used for form powder combination 14. In a typical mechanical alloying process, the powder combination is subjected to repeated welding, fracturing, and re-welding in a high-energy ball mill. A high energy mill is used to promote plastic deformation required for cold welding and to reduce the process times. The mechanical alloying process starts with mixing first material 10 and second material 12 each provided in powder form in a predetermined ratio to form a powder mixture. The powder mixture is loaded into a ball mill along with a grinding medium (e.g., steel balls). The powder mixture is then milled for a predetermined period of time. Processing parameters include the type of mill, the milling container, milling speed (generally about 50 to about 400 rpm, typically about 250 rpm), milling time (generally about 0.5 to about 12 hours), the type, size, and size distribution of the grinding medium (e.g., hardened steel, stainless steel etc.), ball-to-powder weight ratio (generally about 1:1 to as high as about 220:1, with about 10:1 being typical), the extent of filling the vial, the milling atmosphere (e.g., vacuum, nitrogen, or argon), and temperature of milling (generally about room temperature to about 250° C.). In a variation, first material 10 and second material 12 each individually include particles having particle sizes in the range of about 1 to about 200 micrometers (µm) in diameter. The raw powder sources for first material 10 and second material 12 include pure metals, master alloys, or pre-alloyed powders.

In step c), the powder combination 14 is encapsulated to form an encapsulated powder combination 16 surrounded by encapsulating solid skin layer 18 defining a predetermine pattern. Alternatively, powder combination 14 can be placed in a mold. In one variation, the powder combination 14 is encapsulated by canning in capsules of mild steel or other metals compatible to the metal powder. The capsules are produced by sheet metal forming and welding. The capsule is designed to give the fully dense magnet with desired shape. Composite layered magnets can be produced by using the capsule as a part of magnet surfaces. In another variation, the encapsulation is accomplished by selective laser sintering. Selective laser sintering can produce complexly encapsulated metal parts with an integral, gas-impermeable skin. These parts can then be directly post-processed to full density by container-less hot isostatic pressing as set forth below. Selective laser sintering allows the production of freeform, complexly encapsulated, three-dimensional (3-D) parts directly from a computer-aided design (CAD) model. It relies on a computer-generated model as the basis for making a replica, building the complete object with layers of material additions in selected regions. Specifically, an object is created by sequentially fusing thin layers of a powder with a scanning laser beam. Each scanned layer represents a cross section of the object's mathematically sliced CAD model. A high-energy laser beam can directly fuse a metal powder to a semi solid magnetic material part with good density (>70%) under a magnetic field. In step d), a magnetic field from magnet 20 is applied to the powder combination to align the magnetic dipoles therein. In a refinement, the magnetic field is applied during encapsulation and thereafter (during steps e and/or f and/or g set forth below). In another refinement, magnetic field has a magnetic field strength from about 1 to about 3 Tesla (T).

Still referring to FIG. 1, the encapsulated powder combination 16 is isostatically pressed in step e) while heating such that the temperature of the powder combination increases from a first temperature to a second temperature to form a pressed composition 21. In this step, the encapsulated powder combination 16 is positioned in isostatic pressing chamber 22 which includes heaters 24 and inert gas source 26 (e.g., argon or nitrogen) in fluid communication with the isostatic pressing chamber. In a refinement, the encapsulated powder combination is maintained in the magnetic field during the hot isostatic pressing while in another refinement it is not. Typically, the encapsulated powder combination is isostatically pressed with an inert gas such as argon or nitrogen at pressures from 50 MPa to 350 MPa. In some variations, there are additional holding temperatures between the first and the second temperatures, with each having a holding time of 2 minutes to 2 hours. In a refinement, the first temperature is from about 5° C. to about 35° C. and the second temperature is from about 500° C. to about 1000° C. In another refinement, the first temperature is from about 5° C. to about 35° C. and the second temperature is from about 500° C. to about 900° C. In another refinement, the first temperature is from about 5° C. to about 35° C. and the second temperature is from about 550° C. to about 800° C. In another refinement, the encapsulated powder combination is isostatically pressed while heating from a temperature of about 25° C. to a temperature of about 1000° C. In step f), the pressed composition 21 is sintered and heated at a temperature from about 500 to 1000° C. The pressed composition can remain on the magnet after the hot isostatic pressing and heat treatment, or removed by machining or by other mechanical or chemical means. Optionally in step g), the pressed composition 21 is subsequently annealed to further stabilize the microstructures and optimize the magnetic properties. In a refinement, the annealing includes heating the magnetic materials at stepped temperatures, a high temperature to a low temperature. In a refinement, the composition is annealed at 600 to 800° C. for 1 to 5 hours and then 300 to 500° C. for 1 to 5 hours. For example, the composition is annealed at 700° C. for 3 hours and then 400° C. for 3 hours.

Typically, the method of this embodiment produces a magnetic material in which the first material is coated with a layer of the second material. In a refinement, the second material forms a layer having a thickness of about 1 to about 100 microns. In various refinements, the second material forms a layer having a thickness of about, in increasing order of preference, 2 to 100 microns, 2 to 90 microns, 2 to 80 microns, 2 to 70 microns, 2 to 60 microns, or 5 to 20 microns. In particular, the processes set forth herein produce a non-uniform distribution of dysprosium and/or terbium. In this regard, non-uniform distribution means that dysprosium and/or terbium are distributed or concentrated at the interface of the powder particles, with little or none inside the particles.

Advantageously, the methods set forth above allow a lower amount of dysprosium and/or terbium to be used than many prior art process. For example, the amount of dysprosium and/or terbium can be reduced by at least, in increasing order of preference, 2 weight %, 3 weight %, 4 weight %, 5 weight %, 6 weight %, 7 weight %, or 8 weight % as compared to conventional processes. The average dysprosium and/or terbium concentration of the magnet and/or powder combination 14 can be in a range of about 0.3 to about 6 weight percent, or about 0.3 to about 5 weight percent, or about 0.3 to about 4 weight percent, or about 0.3 to about 3 weight percent, compared with about 6 to 9 weight percent for traditional magnets having similar high magnetic properties. In a refinement, the magnet and/or powder combination 14 includes Tb in an average concentration from about zero to about 3 weight percent. The coating process creates powder particles with a dysprosium and/or terbium surface concentration as high as about 5 to about 80 weight % or more, and a low dysprosium and/or terbium bulk concentration (i.e., inside the particles). Dysprosium and/or terbium could be intentionally added or partially diffused into the powder particle from the particle surface, if desired. However, the bulk concentration of dysprosium and/or terbium inside the particles is less than the surface concentration of dysprosium and/or terbium. The coating process is introduced into the current preparation for the powder metallurgy process as an extra step. It should be appreciated that, in a refinement, the dysprosium and/or terbium concentration distribution feature can be manipulated by various heat treatments of the magnets, especially annealing schedules. A longer time or higher temperature can make the distribution wider and less concentrated at the particle surface.

Dy or Tb or both can be used, as desired. If Tb is included, not as much Dy is needed. For example, the combination of Dy and Tb could be less than about 6 weight percent. Tb can be much more effective than Dy in improving magnetic properties. However, this should be balanced against the significantly higher cost of Tb. A ratio of Dy to Tb of up to about 10 can be used if desired.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method of making a magnetic material, the method comprising:
   a) providing a first material including a core powder containing Nd, Fe and B;
   b) combining the first material with a second material to form a powder combination, the second material comprising a component selected from the group consisting of Dy, Tb, and combinations thereof;
   c) encapsulating the powder combination to form an encapsulated powder combination by selectively laser sintering the powder combination to form a solid skin defining a predetermined pattern;
   d) applying a magnetic field during encapsulating and thereafter to the powder combination to impart magnetization thereto; and
   e) isostatically pressing the encapsulated powder combination while heating such that the temperature of the powder combination increases from a first temperature to a second temperature to form a pressed composition.

2. The method of claim 1 further comprising:
   f) heating and sintering the pressed composition at a temperature from about 500 to 1000° C.

3. The method of claim 1 further comprising subsequent annealing to further stabilize microstructures in the pressed composition and optimize magnetic properties of the pressed composition.

4. The method of claim 3 wherein the annealing includes heating the pressed composition at stepped temperatures from a high temperature to a low temperature.

5. The method of claim 1 wherein the step of isostatically pressing the encapsulated powder combination includes pressing the powder combination with an inert gas at pressures from 50 MPa to 350 MPa.

6. The method of claim 1 wherein the first temperature is from about 5° C. to about 35° C. and the second temperature is from about 500° C. to about 1000° C.

7. The method of claim 5 wherein the inert gas is argon or nitrogen.

8. The method of claim 1 wherein the powder combination includes a coating of the second material disposed over the first material.

9. The method of claim 8 wherein the coating includes dysprosium, terbium, or combinations thereof.

10. The method of claim 8 wherein the pressed composition includes a non-uniform distribution of Dy, Tb, or combinations thereof.

11. The method of claim 1 wherein the powder combination includes Dy in an average concentration from about 0.3 to about 6 weight percent.

12. The method of claim 1 wherein the powder combination includes Tb in an average concentration from about zero to about 3 weight percent.

13. The method of claim 1 wherein the magnetic field has a magnetic field strength from about 1 to about 3 Tesla (T).

14. The method of claim 1 wherein the first material is described by formula $Nd_2Fe_{14}B$.

15. The method of claim 14 wherein the first material further includes a component selected from the group consisting of Pr, Ga, Co, Cu, and combinations thereof.

16. The method of claim 1 wherein the second material comprises from about 5 to about 95 weight percent dysprosium and 95 to 5 weight percent terbium.

17. The method of claim 16 wherein the second material further includes a component selected from the group consisting of Fe, B, Pr, Ga, B, Co, Cu, and combinations thereof.

18. A method of making a magnetic material, the method comprising:
   a) providing a core powder containing Nd, Fe and B;

b) combining the core powder with a rare earth metal-containing powder to form a powder combination;
c) encapsulating the powder combination to form an encapsulated powder combination by selective laser sintering the powder combination to form a solid skin defining a predetermined pattern;
d) applying a magnetic field to the powder combination to impart magnetization thereto;
e) isostatically pressing the encapsulated powder combination with an inert gas at pressures from 50 MPa to 350 MPa, the encapsulated powder combination being heated such that the temperature of the powder combination increases from a first temperature of about 5° C. to 35° C. to a second temperature of about 500° C. to 1000° C. to form a pressed composition; and
f) heating and sintering the pressed composition at a temperature from about 500 to 1000° C.

19. The method of claim 18 wherein the rare earth metal-containing powder includes a component selected from the group consisting of dysprosium, terbium, and combinations thereof.

20. The method of claim 18 further comprising subsequent annealing to further stabilize microstructures in the pressed composition and optimize magnetic properties of the pressed composition.

21. The method of claim 18 wherein the annealing includes heating the pressed composition at stepped temperatures, a high temperature to a low temperature.

* * * * *